Aug. 4, 1964    J. R. McGEHEE ETAL    3,143,321
FRANGIBLE TUBE ENERGY DISSIPATION
Filed July 12, 1962    3 Sheets-Sheet 1
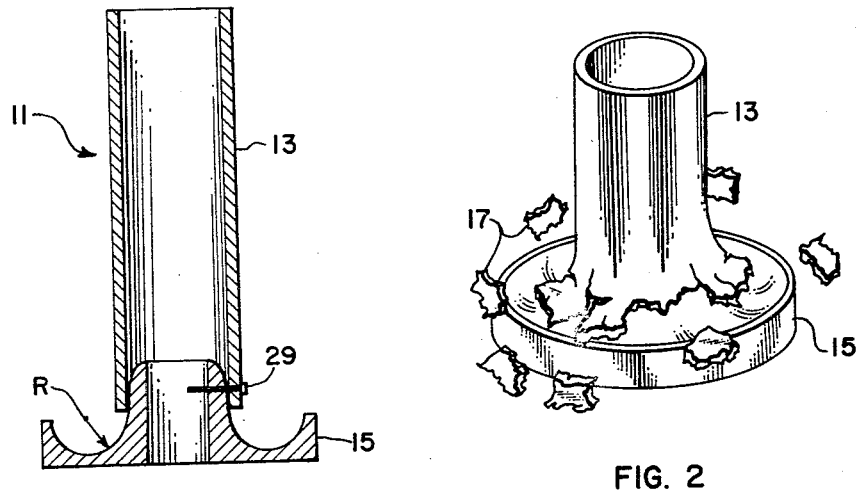
FIG. 1
FIG. 2
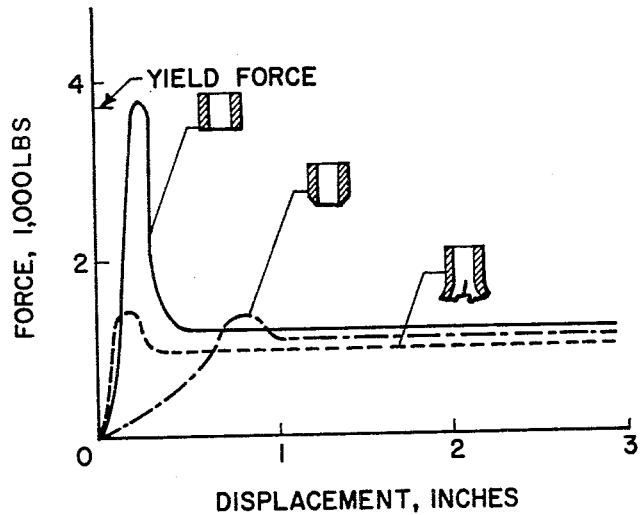
FIG. 8
INVENTORS
JOHN R. McGEHEE
MELVIN E. HATHAWAY
EDMOND J. ZAVADA
BY
ATTORNEYS Aug. 4, 1964   J. R. McGEHEE ETAL   3,143,321
FRANGIBLE TUBE ENERGY DISSIPATION Filed July 12, 1962   3 Sheets-Sheet 3

INVENTORS
JOHN R. McGEHEE
MELVIN E. HATHAWAY
EDMOND J. ZAVADA

BY
ATTORNEYS

United States Patent Office 3,143,321
Patented Aug. 4, 1964

3,143,321
FRANGIBLE TUBE ENERGY DISSIPATION
John R. McGehee, Newport News, and Melvin E. Hathaway and Edmond J. Zavada, Hampton, Va., assignors to the United States of America as represented by the Administrator of the National Aeronautics and Space Administration
Filed July 12, 1962, Ser. No. 209,479
20 Claims. (Cl. 244—100)
(Granted under Title 35, U.S. Code (1952), sec. 266)

The invention described herein may be manufactured and used by or for the Government of the United States of America for governmental purposes without the payment of any royalties thereon or therefor.

This invention relates generally to shock absorbers. More particularly, this invention relates to a shock absorber system wherein frangible tube members are adapted to be fragmented by a moving body to dissipate the load energy forces generated thereby for arresting movement of the moving body.

A perfect shock absorber is considered to be one that will provide a uniform retarding force throughout the full length of its stroke since a constant retarding force will result in constant deceleration of the load. Elastic shock absorbers, such as springs, cushions, and the like, provide a progressively increasing retarding force as they are depressed and do not absorb most of the energy, but merely convert it into a different form which is subject to rebound. This rebounding force obviously could cause damage to human occupants and sensitive equipment contained within moving vehicles when they are suddenly brought to rest by the use of elastic shock absorbers. It is also known that a shock absorber providing a constant retarding force, equal to the maximum retarding force acceptable without damage to the load, can bring a load safely to rest in approximately one half the stroke distance of an elastic shock absorber in which the retarding force gradually builds up to such maximum acceptable retarding or braking force. It has further been determined that conditions approaching that of the ideal shock absorber or braking system can be obtained with well-known hydraulic types of shock absorbers, but these are complicated, costly, and of considerable mass which is particularly undesirable for use in the design and construction of various types of vehicles, such, for example, as in the manufacture of space- and aircraft, occupant seat mounts therein, and other component parts, as well as in numerous other applications. There is thus a definite need in the art for a lightweight reliable constant force dissipating shock absorbing system, with obvious utility in the field of space and aeronautics; as a safety shock absorber means for the use at the foot of elevator shafts and in like emergency positions, and in arresting the movement, as well as to minimize collision or impact damage, of any moving vehicle, such for example as space vehicles, trains and automobiles.

One heretofore constant decelerating force energy dissipation system employs the use of compressible honeycomb cellular material to absorb the load energy forces. This particular prior art energy dissipating system proved quite successful in dissipating the load energy forces exerted on the occupant in the now-famous Mercury capsule recovery system, disclosed in U.S. Patent 3,038,175. However, the honeycomb material is quite expensive and requires considerable human skill to manufacture, which makes it impractical for use in aerial vehicle landing gear assemblies and numerous other applications.

Another prior art energy dissipating system involves the use of balsa wood cut across the grain so as to compress upon the application of load energy forces thereto and act as a cushion shock absorber. This prior art energy dissipator, although quite capable for the purposes contemplated, is bulky and is further not capable of absorbing the energy shocks as efficiently as that of the present disclosure.

One practical application of the present invention is in proposed recovery systems for payloads, such for example as occupant capsules, adapted to be placed in orbit about the earth and recoverable from preselected land areas, wherein the recovery apparatus is chargeable against payload weight and, accordingly, must be limited in weight due to present day rocket booster capabilities. Present day recovery methods for such payloads have been successfully accomplished only in bodies of water wherein the impact load forces are sufficiently minimized by the water to safely employ available lightweight vehicle shock absorbing apparatus. Numerous hazards are obviously encountered in each attempt to recover payloads from water that would not be present in a land recovery system. By use of the present invention it is anticipated therefore that efficient lightweight shock absorber apparatus can be employed for payloads that will enable the recovery thereof in preselected land areas and thus avoid all the hazards encountered in water recovery attempts.

It is therefore an object of the present invention to provide a simple, lightweight, constant decelerating force energy dissipation system.

Another object of the instant invention is the provision of a frangible tube assembly for dissipating load energy force of a moving body.

Still another object of the present invention is the provision of a constant energy deceleration device capable of braking moving vehicles without damage to occupants or sensitive instrumentation contained therein.

A further object of the present invention is the provision of a new and novel landing gear assembly for aerial vehicles.

A still further object of the instant invention is to provide a one-shot shock absorber system for moving bodies.

In accordance with the present invention, the foregoing and other objects are attained by providing frangible tubular members longitudinally disposed in relation to a moving body with the free end of the frangible tube members slidably receiving the shaft of a die or reaction member wherein, upon application of longitudinal load energy forces to said tubular members the relative movement between the tubular member and die member will cause internal pressure to be uniformly exerted on the end internal surface of the tubular members with resulting progressive fragmentation thereof tending to absorb or dissipate the load energy force as it is applied.

When employing the present invention as the working element or shock absorber in a landing gear arrangement for aerial vehicles, a plurality of tubular members are employed to coact with an equal number of die members fixedly attached to a target anticipator with the external surface of the target anticipator being formed as a conventional reentry heat shield protective device.

When employing the present invention as a brake or shock absorber means for other types of moving vehicles, the target anticipator may be replaced by a conventional bumper assembly designed for contact with a relatively slowly moving body to apply longitudinal load energy force onto the tubular members for effecting progressive fragmentation along the length thereof while dissipating the load energy forces developed by the moving body.

When employed as a stop mechanism safety device for elevators and like objects, the die or reaction members may be conveniently disposed at the bottom of the elevator shaft with the length and number of tubular members being determined according to the maximum load energy forces expected. A more complete appreciation of the invention and many of the attendant advantages thereof will be readily appreciated as the same becomes better understood by reference to the following detailed description when considered in connection with the accompanying drawings wherein:

FIG. 1 is a cross-sectional view of a shock absorber constructed in accordance with the present invention;

FIG. 2 is a perspective view of the shock absorber shown in FIG. 1 as it appears upon the application of longitudinally load energy force applied thereto;

Figure 3A:
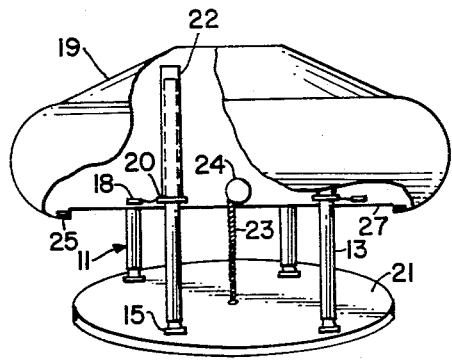
Figure 4A:
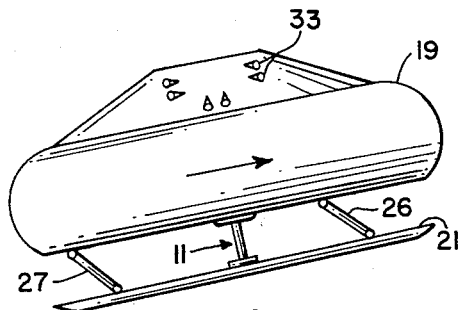
Figure 3B:
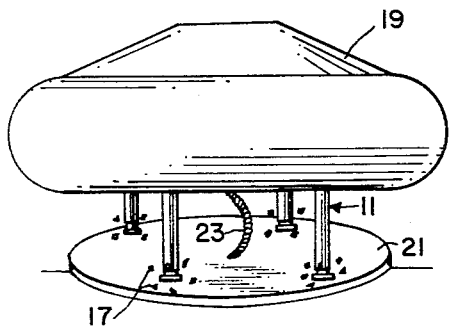
Figure 4B:
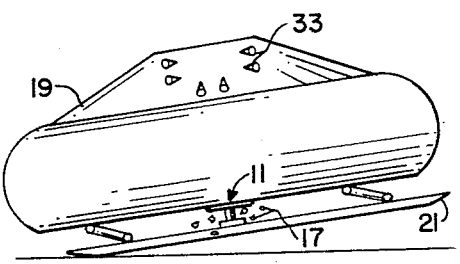
Figure 3C:
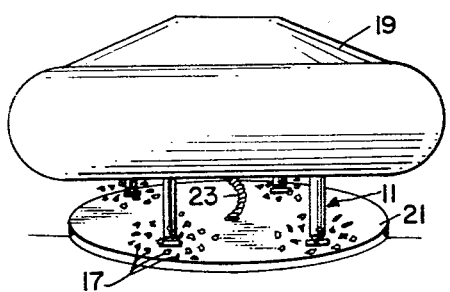
Figure 4C:
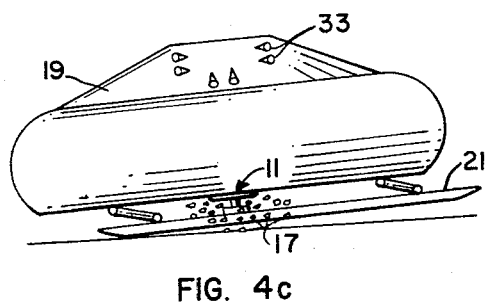
Figure 5:
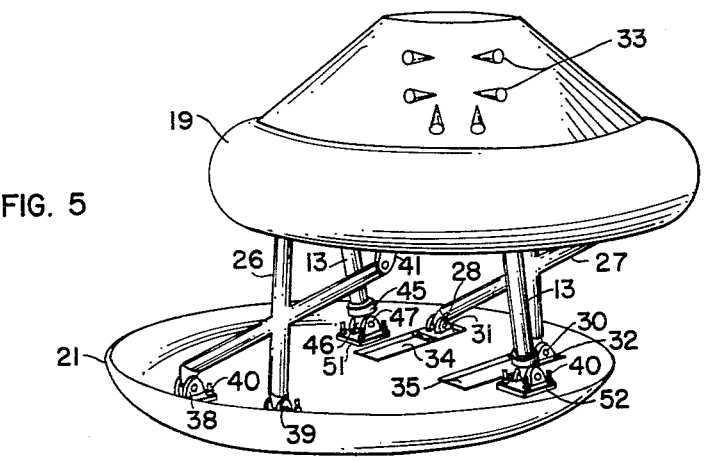

FIGS. 3a, 3b, and 3c are sequence perspective views of a vertically landing aerial vehicle employing a landing gear arrangement constructed in accordance with the present invention;

FIGS. 4a, 4b, and 4c are sequence perspective views of an aerial vehicle landing in the direction of the arrow with a modified landing gear arrangement in accordance with the present invention;

FIG. 5 is a perspective view of the landing gear modification employed for the substantially horizontal landing illustrated in FIGS. 4a–4c.

Figure 6:
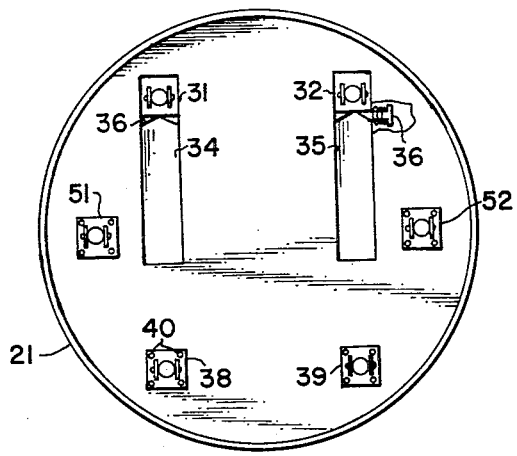
Figure 7:
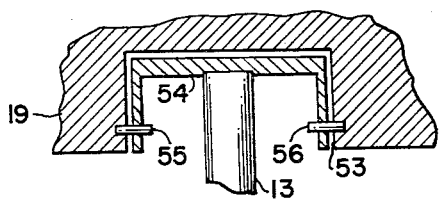

FIG. 6 is a plan view of the heat-shield-target anticipator employed for horizontal landings with parts omitted for clarity;

FIG. 7 is an enlarged sectional view of the mechanism connecting the fragmentation tubes with an aerial vehicle as employed in landing gears for horizontal landings; and, FIG. 8 is a graphic representation of the force energy required to initiate fragmentation or tubular displacement of tubular members having squared, tapered, and pre-crushed end portions.

Referring now more particularly to the drawings wherein like reference numerals designate identical or corresponding parts throughout the several views, and more particularly to FIG. 1, the shock absorber of the present invention is generally designated by reference numeral 11 and consists of a tubular member 13 having a die or reaction member 15 disposed within the end portion thereof. Die member 15 consists of a base and a reduced diameter perpendicularly disposed shank integral therewith.

The die shank is slidably received by tubular member 13 and is employed as a centering aid for positioning and maintaining tubular member 13 adjacent base 15. The shank tip is formed with a slight frusto-conical configuration as a further positioning aid.

The base portion of die 15, merges with the shank and is provided with a circular concave groove, or hemispherical ring impression, having a uniform radius R, with the ring inner diameter being equal to the external diameter of the shank.

Any number of conventional shear pins, one of which is designated by reference numeral 29, may be employed to retain the shank of die members 15 within tubes when desired, although, in some circumstances, the slight frictional engagement of the parts serves as adequate retention means therefor.

As shown more particularly in FIG. 2, when a longitudinal load energy force is applied to tubular member 13, die or reaction member 15 moves relatively toward said tubular member, shearing pins 29, and causing sliding movement of tubular member 13 about the die shaft into the base groove.

As the end of tubular member 13 is slidably forced into the die groove, it ruptures into fragments 17 due to the stress being exerted uniformly over the internal end surface thereof by the die member. This fragmentation occurs only along the tube end portion as it is stressed beyond the ultimate tensile strength thereof. The progressive fragmentation of tube 13 uniformly absorbs or dissipates the load energy forces being applied as long as any unfragmented tube length remains above the tip of the die shank. Thus, it is desirable to maintain the shank length at a minimum to permit utilization of the maximum length of tubular member 13 for energy dissipation in a given situation. The fragmentation of tubular member 13 is accomplishable in this manner due to its physical property characteristics and the construction and arrangement of the coacting die member.

Referring now to FIGS. 3a, 3b, and 3c, the sequence landing of an aerial vehicle 19 illustrating one practical application of the present invention is shown. In this embodiment of the present invention a plurality of shock absorber assemblies 11 are employed as shock absorbing load energy dissipation means for aerial vehicle 19 which is adapted for landing essentially vertical in relation to the earth's surface after returning through the atmosphere from a space flight. The landing gear arrangement of vehicle 19 comprises a target anticipator plate 21, with a plurality of die members 15 secured to the face thereof and a plurality of tubular members 13, equal in number to, and coacting with the die members, being provided for vehicle load energy dissipation. Target anticipator 21 is provided with conventional ablation-type heat-shield surface portions thereon to protect vehicle 19 during reentry into the earth's atmosphere.

The tubular members 13 in this embodiment are slidably retained within the vertical passages 22 in vehicle 19, with heat-shield-target anticipator plate 21 being retained in reentry position flush with vehicle 19 by a plurality of conventional explosive bolts 25. In response to a suitable signal, bolts 25 are ruptured and target anticipator 21 drops under its own weight to the position shown in FIG. 3a. A fixed-length snubber cord 23, having one end attached to freely rotatable spool 24, and the other end secured to heat shield plate 21, limits the movement of plate 21 relative to vehicle 19 so that the slidable engagement of tubular members 13 with the shank of the reaction members 15 is maintained. A plurality of sliding plates 20, activated by solenoids 18 or other suitable conventional mechanism, are actuated in a conventional manner to close passages 22 and prevent subsequent return therein of tubular members 13. In some applications of the present invention it may also be found desirable to provide die or reaction members 15 at each end of tubular members 13, in which case passage closures 20 could be formed of that configuration. Since the end portions of tubular members 13 adjacent to the body of the vehicle 19 are rigidly retained in the extended position by suitable means, the only permitted movement thereof is about die members 15.

Upon contact of target anticipator plate 21 with the earth's surface, the load energy forces developed by moving vehicle 19 will be exerted along the longitudinal axis of tubular members 13 with resulting inward relative movement being effected between vehicle 19 and plate 21. This causes sliding movement of tubular members 13 about the shaft of die members 15 with resulting progressive fragmentation of the tubular members, due to the internal pressure being exerted by the die shaft, and consequently, provides a uniform deceleration and braking of the movement of vehicle 19.

Where it is desirable to provide for retraction of anticipator 21, spool 24 may be under the control of a suitable reversible motor, not shown, for rewinding of cord 23 therearound to withdraw target anticipator 21 from the extended position. Obviously, in this type of arrangement, plates 20 would be removed from channels 22 by suitable actuation of the respective solenoids 18 therefor.

Referring now more particularly to FIG. 6, a modified landing gear assembly for an aerial vehicle adapted for contact with the earth's surface in a substantially horizontal attitude, while also having a vertical component of velocity, is shown. In this embodiment of the present invention the combination heat-shield-target anticipator 21 is connected to vehicle 19 by parallel linkage or pivotal X-shaped struts 26 and 27. The leg ends of strut 27 adjacent heat shield 21 are pivotally connected to spindles 28 and 30 within bifurcated brackets 31 and 32. Brackets 31 and 32 are slidably received, respectively, within groove or track areas 34 and 35. A pair of conventional spring-urged lock pins, designated by reference numeral 36 (FIG. 6) are disposed within the sidewall of each track area, the function of which will be further explained hereinafter. The leg ends of strut 27 adjacent vehicle 19 are pivotally attached to suitable similar brackets, not shown, rigid with vehicle 19, as will be further explained hereinafter. The leg ends of strut 26 adjacent heat shield 21 are pivotally connected to bifurcated brackets 38 and 39 which are rigidly attached to heat shield 21 by any conventional means, such for example, bolts 40. The leg ends of strut 26 adjacent vehicle 19 are pivotally attached to a pair of brackets one of which is designated by reference numeral 41 and one, not shown, identical but slidable in an opposite direction, to brackets 31 and 32 within a pair of track or grooves, identical to tracks 34 and 35 but not shown, formed in the base of vehicle 19 facing plate 21.

The energy dissipators in this embodiment also consist of tubular members 13 designed to be fragmented about a modified die or reaction member 45. Two tubular members are illustrated in FIG. 6, although it is obviously within the scope of this invention to vary this number when the need exists. The reaction part of dies 45 are formed identical to members 15 discussed hereinbefore but the base portion thereof is formed with a protuberance 46 for transverse receipt therethrough of pivot pin or arbor 47. Forked brackets 51 and 52 are rigidly attached to plate 21 by suitable means, such for example bolts 40, with arbors 47 passing through the fork portions thereof to pivotally connect reaction members 45 and the associated frangible tubes 13 thereto.

The other end of tubes 13 are secured within cavity 53 of vehicle 19 by means of pivotal saddle 54 and its associated trunnions 55 and 56 (FIG. 7), as will be further explained hereinafter.

Conventional attitude control jets 33, connected to a suitable fuel supply, such for example a hydrogen-peroxide system, are provided about the exterior of vehicle 19. Jets 33 are selectively controllable by the occupant of vehicle 19 in a conventional manner to attain the desired vehicle attitude during flight and landing of vehicle 19.

The operation of this embodiment is very similar to the vertical landing embodiment described hereinbefore. Vehicle 19 is placed in orbital flight by conventional rocket boosters with heat shield 21 being pivoted from the position shown in FIG. 5 to flush engagement with vehicle 19. This flush engagement is readily obtainable due to X-strut 27 being connected at one end to the sliding arrangement of brackets 31 and 32 within track areas 34 and 35 and the like arrangement for the end of X-strut 26 which is secured adjacent to vehicle 19 by bracket 41 and another, not shown. In this folded or pivoted position, saddles 54 rotate about trunnions 55 and 56, and protuberances 46 on reaction members 45 rotate about arbors 47 to permit frangible tube members 13 to lie flat within cavity 53 of vehicle 19 until extended.

After reentry into the earth's atmosphere, and after plate 21 has performed its conventional heat shielding function, the occupant of vehicle 19 selects the landing area therefor, which may be a conventional airfield runway. By selective actuation of jets 33, the occupant positions vehicle 19 in the desired landing angle of attack while also lowering the target anticipator plate 21 and shock absorber assemblies 11 to the position shown in FIGS. 5 and 4a. This lowering of plate 21 may be accomplished in any conventional manner, such for example by the use of conventional hydraulic pressure actuated mechanism or spring means, not shown, acting on the slidable brackets.

When brackets 31 and 32 reach the end of tracks 34 and 35, and the like conditions exist for bracket 41 and the other, not shown, securing X-strut 26 to vehicle 19, spring-urged lock pins 36 (FIG. 6) prevent return thereof and plate 21 is locked in the landing position pivoted slightly forward from the base of vehicle 19. As X-struts 26 and 27 rotate about their respective pivot points to the position shown in FIGS. 5 and 4a, saddles 54 rotate about trunnions 55 and 56 to vertically position tubular members 13.

Further rotation of the various members about their respective pivot points is prevented at this stage due to combination of the slidable brackets 31, 32, 41 and the other, not shown, reaching the end of their associated tracks, and due to the length of frangible tubes 13.

When plate 21 contacts the earth's surface, as shown more particularly in the landing sequence illustrated in FIGS. 4c–4c, the impact load energy forces of vehicle 19 act along the longitudinal axis of tubular members 13 causing them to slide onto dies 45 with resulting progressive fragmentation of tubular members 13. As tubes 13 fragment the vehicle load energy forces are uniformly dissipated causing a constant deceleration of vehicle 19 while permitting relative movement of plate 21 toward vehicle 19. Since lock pins 36 prevent further movement of brackets 31, 32, 41, and the other bracket not shown, plate 21 must of necessity continue to pivot slightly forward of vehicle 19 as tubes 13 fragment and become progressively shorter. This forward positioning of plate 21 as it moves relatively toward vehicle 19 aids to nullify any pitching moment that might tend to overturn vehicle 19 during the landing.

This progressive fragmentation of tubular members 13, throughout the entire lengths thereof if needed, dissipates all the vertical load energy forces generated by vehicle 19 as well as some of the horizontal load energy forces. The remainder of the horizontal load energy force is taken up by struts 26 and 27 and is dissipated by the frictional contact of plate 21 with the runway surface while vehicle 19 is safely and uniformly brought to rest.

After each landing tubular members 13 may be replaced and the one-shot energy dissipation system thereby made ready for another operation. In this embodiment, as well as that illustrated in FIGS. 3a–3c, suitable parachute means, not shown, may also be attached to vehicle 19 to aid in deceleration thereof prior to impact with the earth, when so desired.

The number of tubular members 13 employed in a specific deceleration apparatus will vary according to the construction thereof and the amount of anticipated energy to be absorbed. In the embodiments hereinbefore described, tubular members 13 are constructed from aluminum alloy, such for example 2024–T3 aluminum alloy tubing, with the column length-diameter ratio being restricted to a maximum value of ten and the rate of displacement being controlled to that desired by varying the number of tubular columns employed in a particular application. This 2024–T3 aluminum alloy tubing was found to possess the desired brittleness factor for fragmentation energy dissipation although other materials having similar physical property characteristics are obviously within the scope of this invention. As is apparent to those skilled in the art, the average load energy stress required to initiate fragmentation of tubular members 13 is a function of the strength of the tubing material or brittleness factor, the tube diameter-wall thickness ratio, and the tube wall thickness-die radius ratio. Experimental results have shown that tubes having a mean wall thickness-die radius ratio of approximately 0.43 are applicable in the present invention. Tubular members having wall thickness-die radius ratios considerably higher than this, for example, 0.65 and above, tend to buckle and fail upon the application of longitudinally applied load energy forces, while those having wall thickness-die radius ratios considerably less than 0.43, for example less than 0.30, tend to roll and do not dissipate the load energy forces as effectively as those that fragment.

The material employed to manufacture the die or reaction members 15 and 45 may be a conventional hard steel alloy, or other suitable material of stronger resistance than the material employed to make tubular members 13.

In an experimental operation of the present invention, a ⅕-scale model of a landing vehicle with four of the 2024–T3 aluminum alloy tubes having a ¾-inch diameter and 0.065-inch wall thickness were used as the fragmenting landing gear assembly. The dies or reaction members 15 were attached to the combination heat-shield-target anticipator plate 21 and the restraint or strut cord 23 employed to keep the tubes in contact with the vehicle body 19 and about the shaft portion of dies 15. From this experiment, it was determined that the aluminum alloy tubing employed for the tubular members, when fragmenting on a die or reaction member at ninety percent of the yield stress, a value which was also obtained in the experimental program, is capable of dissipating 31,000 ft./lb. of energy per pound of material. This energy dissipation capability is greater than that of the high energy dissipation capability of balsa wood crushed either parallel to the grain or perpendicular to the grain, and also considerably greater than the energy dissipation obtained by crushing ⅜-inch cell aluminum honeycomb. In addition, since the fragmenting tube does not exhibit the violent rebound characteristics that are associated with the dynamic crushing to balsa wood and aluminum honeycomb, the advantages of the fragmentation tube energy dissipation system according to the present invention are readily apparent.

It has been further experimentally determined, referring now more particularly to FIG. 8, that by pretreating the end portion of tubular members 13 that are to be fragmented, such for example as by precrushing or pre-fragmenting a portion of the length thereof, or by providing a tapered surface at the end portion thereof, that the initial force required to initiate fragmentation is considerably reduced. It is thus readily apparent, from analyzing the results illustrated in FIG. 8, that to further minimize the forces being exerted on human occupants or sensitive intrumentation in a vehicle returning to earth from outer space, it is desirable to employ tapered tubular members 13 as the fragmenting energy dissipating elements therefor. As shown in FIG. 8, the initial force required to initiate fragmentation of squared end tubular members 13 is approximately 4,000 lbs. which would exert considerable gravitational or "g" forces on the human occupant and sensitive instrumentation within the vehicle body member 19. However, by tapering or pre-fragmenting a portion of the end of tubular member 13, this initial force is considerably reduced and abrupt changes in the deceleration forces during tubular fragmentation are avoided. A ¼-inch taper for tubular member 13 was found sufficient to reduce the initial force in the embodiments described hereinbefore.

Obviously, numerous modifications of the described embodiments will readily be apparent to those skilled in the art. For example, in lieu of the snubber or strut cord 23 shown in FIGS. 3a–3c of the drawings, it is within the scope of this invention to employ shear elements or other conventional means to maintain tubular members 13 positioned about die or reaction members 15 until the initial fragmentation thereof. Also, in FIG. 6, the various rigid bracket members may be formed with heat-shield-target anticipator plate 21 and the base of vehicle 19 in lieu of the bolt connections described hereinbefore. The track areas described in the embodiment illustrated in FIG. 6 may be formed as ridges instead of the illustrated grooves with the slidable brackets being provided with mating groove surfaces to coact with the tracks. Also lock pins 36 may be positioned on the slidable brackets instead of within the tracks, when so desired. In addition, when employing the teachings of the present invention in connection with a safety shock absorption system, such as a safety feature for building elevators and in aircraft seat mounts, the target anticipator plate 21 could be omitted entirely with the die or reaction members 15 being maintained within the tubular members only by suitable shearing means, and at which time the individual tubular members would fragment against the die members upon contact of the die members with a relatively slower moving object or upon the application of sufficient load energy forces thereto. Also, as mentioned heretofore, this invention has obvious utility in the use of shock absorbing mounting means for bumper means for trains and automobiles, in which case the tubular members 13 would act directly against die members 15 attached as an integral part of the train or automobile bumper or frame member, to absorb the shocks received thereby. It is thus seen that the present invention fulfills a definite need in the art for a reliable lightweight constant decelerating energy dissipating shock absorber system.

It is to be understood, therefore, that the foregoing disclosure relates only to preferred embodiments of the invention, and that numerous modifications and variations of the present invention are possible in the light of the above teachings, as will be readily apparent to those skilled in the art, without departing from the spirit and scope of the present invention, as set forth in the appending claims.

What is claimed and desired to be secured by Letters Patent of the United States is:

1. Apparatus effecting constant deceleration of a moving body comprising, in combination: a movable body and tubular means perpendicularly adjacent said movable body to receive, along the longitudinal axis thereof, the load energy forces generated by said body upon body movement arrest; means internally coacting with at least one end of said tubular means, said tubular means and said means internally coacting therewith being constructed and arranged so that the receipt of said load energy forces along the longitudinal axis thereof will result in an increased stress of said tubular means along the internal diameter thereof beyond its ultimate tensile strength progressively over at least a portion of the length thereof to thereby uniformly dissipate the load energy forces being applied to said tubular means and provide constant deceleration of said moving body.

2. Apparatus according to claim 1 wherein said tubular means have the inherent physical property characteristic of dissipating load energy by progressively breaking up into a plurality of fragments along the stressed portion thereof when said means internally coacting therewith stress said tubular means beyond the ultimate tensile strength thereof.

3. Load energy dissipation apparatus comprising: at least a pair of coacting members, one of said members being of tubular construction and adapted to receive a load energy force along the longitudinal axis thereof, the other of said members internally tensioning said tubular member beyond the ultimate tensile strength thereof and effecting fragmentation of said tubular member during the application of load energy force thereto, the fragmentation of said tubular member dissipating at least a portion of the load energy force.

4. A load energy dissipation means for aerial vehicles comprising, in combination: an aerial vehicle and a landing gear arrangement therefor; said landing gear arrangement including a plurality of tubular members perpendicularly adjacent said vehicle and a plurality of reaction members each having a shank portion positionable within the end portion of each individual tubular member spaced from said vehicle; said reaction members being operatively connected to target anticipator means and each said reaction member shank merging with a circular groove of hemispherical cross-sectional area formed on said reaction member whereby, when said target anticipator means engages a target, the load energy force of said aerial vehicle will act essentially along the longitudinal axis of said tubular members causing sliding movement thereof relative to the individual reaction member shanks associated therewith to effect movement of said tubular members into individual ones of said grooves to thereby progressively stress portions of said tubular members beyond the ultimate tensile strength thereof and cause progressive fragmentation of said tubular members with simultaneous uniform dissipation of said load energy force resulting in constant deceleration of said vehicle.

5. A braking system for a movable body comprising, in combination: a movable body and relatively movable bumper means spaced from said body; at least one tubular member perpendicularly adjacent said body and said bumper, at least one reaction member internally coacting with one end of said tubular member, said reaction member including a base and an integral shank portion, said shank portion slidably extending a distance into one end of said tubular member and increasing in diameter at the fixed end thereof to merge with a hemispherical ring impression formed on the base surface of said reaction member facing said tubular member whereby, when said bumper means contacts a relatively slower moving object, said bumper will move relatively toward said body and said tubular member will slide further onto said shank portion of said reaction member causing progressively increased internal stress along the internal diameter of said tubular member with resulting progressive fragmentation thereof to thereby uniformly brake the movement of said movable body.

6. A braking system for a movable body comprising, in combination: a movable body and bumper means attached to said body and movable from a position flush with said body to a position spaced from said body; a plurality of tubular members perpendicularly positionable between said body and said bumper, a plurality of reaction members equal in number to said tubular members and each internally coacting individually with one of said tubular members, said reaction members each including a base portion and an integral shank portion, each said shank portion slidably extending a distance into one end of each said tubular member, each said base portion having a circular concave groove formed therein in such manner that the internal diameter groove area engages the internal surface of each said tubular member when positioned on said shanks, whereby upon contact of said bumper with a relatively slower moving object, said shank portion of said reaction members will slide relatively within said tubular members causing the end of said tubular members to conform to the shape of said concave grooves due to the increased internal pressure exerted therein with corresponding induced progressive tubular fragmentation uniformly braking the movement of said movable body.

7. A load energy dissipation means for aerial vehicles comprising, in combination: an aerial vehicle and a landing gear arrangement therefor; said landing gear arrangement including at least one tubular member, at least one reaction member having a shaft portion positionable within an end portion of said tubular member spaced from said vehicle, said reaction member shaft merging with an enlarged circular groove of hemispherical cross-sectional area formed on said reaction member said reaction member being secured to target contact means, said tubular member and said reaction member being so constructed and arranged that when said target contact means engages a target the load energy force of said aerial vehicle will act along the longitudinal axis of said tubular members causing sliding movement thereof relative to said reaction member to effect progressive fragmentation of said tubular means as said tubular means enters into the enlarged circular groove of said reaction member.

8. A shock absorber comprising: a metal tube and reaction means for applying internal stress progressively along the internal diameter of said tube upon the application of load energy force along the longitudinal axis of said tube, said reaction means including a base and a perpendicularly disposed reduced diameter shank, said shank normally extending a distance into said tube and merging with a hemispherical ring impression formed on said base with the ring inner diameter being equal to the external diameter of said shank.

9. A landing arrangement for an aerial vehicle comprising: an aerial vehicle body and a heat shield for said aerial vehicle body; said heat shield being positionable from a first position flush with said vehicle body to a second position spaced from said vehicle body, shock absorber means interpositioned between said vehicle body and said heat shield when said heat shield is in said second position; said shock absorber means comprising a plurality of tubular members perpendicularly disposed in relation to said heat shield and an equal number of reaction members internally received thereby, said reaction members each having a shank and a base portion, said shanks being individually received by said tubular members and said base portions abutting said heat shield, said shank portions further each increasing in diameter to merge with respective base portions in the form of a continuous concave groove having an internal diameter essentially equal to the internal diameter of said tubular members whereby when said heat shield is in said second position and comes in contact with a relatively slower moving object the load energy forces generated by said aerial vehicle will induce relative movement of said heat shield toward said vehicle body with resulting relative movement of said tubular members onto said shank portions along the surface of said groove thereby causing internal force to be exerted within the end of said tubular members with resulting progressive fragmentation thereof dissipating the load energy forces generated by said aerial vehicle body.

10. A landing arrangement as in claim 9 including means for initially retaining said heat shield in said first position.

11. A landing arrangement as in claim 10 wherein said means for initially retaining said heat shield in said first position includes a plurality of explosive bolt members.

12. A landing arrangement as in claim 9 including means limiting the distance said heat shield is spaced from said vehicle body in said second position.

13. A landing arrangement as in claim 12 wherein said means limiting the distance said heat shield is spaced from said aerial vehicle in said second position includes a fixed length cord having one end secured to said heat shield and the other end thereof secured to a freely rotatable spool within said vehicle body.

14. A landing arrangement as in claim 9 including means on said vehicle for controlling the angle of attack of said vehicle relative to the earth during landing thereon.

15. A landing arrangement as in claim 9 wherein an external portion of said tubular members are tapered toward the individual ends thereof that receive said shank portions.

16. A landing arrangement as in claim 9 wherein said tubular members are prefragmented over a portion of the length thereof that receive said shank portions.

17. A landing arrangement as in claim 9 wherein said tubular members are of individual constant wall thickness throughout the length thereof.

18. A landing arrangement according to claim 9 wherein when said heat shield is in said first position said shock absorber means are retained within said vehicle and means preventing reentry of said shock absorber means therein once said heat shield is positioned in said second position.

19. A landing arrangement according to claim 18 wherein said means preventing reentry of said shock absorber means within said vehicle includes a plurality of sliding plates equal in number to said tubular members.

20. A landing arrangement according to claim 18 wherein said means preventing reentry of said shock absorber means within said vehicle includes pivotal strut members locked in position between said vehicle body and said heat shield.

References Cited in the file of this patent

UNITED STATES PATENTS

| | | |
|---|---|---|
| 2,391,275 | Shaw | Dec. 18, 1945 |
| 2,870,871 | Stevinson | Jan. 27, 1959 |
| 2,961,204 | Rayfield et al. | Nov. 22, 1960 |
| 3,032,302 | Clark | May 1, 1962 |